United States Patent [19]
Cromm

[11] Patent Number: 4,768,644
[45] Date of Patent: Sep. 6, 1988

[54] SCRAPER DEVICE FOR CONVEYER BELT SYSTEMS

[75] Inventor: Gerd W. Cromm, Dortmund, Fed. Rep. of Germany

[73] Assignee: VULKAN Verfahrenstechnik B. Hackforth GmbH & Co. KG, Herne, Fed. Rep. of Germany

[21] Appl. No.: 76,329

[22] Filed: Jul. 22, 1987

[30] Foreign Application Priority Data

Jul. 22, 1986 [DE] Fed. Rep. of Germany ....... 3624754

[51] Int. Cl.⁴ ............................................. B65G 45/00
[52] U.S. Cl. .................................... 198/499; 15/256.5
[58] Field of Search ............................... 198/497–499; 15/256.5

[56] References Cited

U.S. PATENT DOCUMENTS

| | | | |
|---|---|---|---|
| 3,841,470 | 10/1974 | Meguro | 198/499 |
| 4,036,351 | 7/1977 | Reiter | 198/499 |
| 4,359,150 | 11/1982 | Bowman et al. | 198/499 X |
| 4,535,883 | 8/1985 | Kerr | 198/499 |
| 4,633,999 | 1/1987 | Perneczky | 198/499 |

FOREIGN PATENT DOCUMENTS

| | | | |
|---|---|---|---|
| 0004809 | 10/1979 | European Pat. Off. | 198/497 |
| 2709714 | 9/1978 | Fed. Rep. of Germany | 198/497 |
| 3211626 | 10/1983 | Fed. Rep. of Germany | |

Primary Examiner—Robert J. Spar
Assistant Examiner—Lyle K. Kimms
Attorney, Agent, or Firm—Becker & Becker, Inc.

[57] ABSTRACT

A scraper device having a number of identical scraper elements that extend one beside another substantially over the width of a conveyer belt. Each scraper element basically comprises: a metal scraper or doctor blade that is in resilient engagement with the conveyer belt; an arm that supports the scraper blade; and a resilient articulation that is disposed at the free end of the support arm. The stationary part of the articulation is releasably secured to a common support tube that extends transverse to the direction of conveyance and parallel to the conveyer belt. The point where the scraper edge engages the belt in relation to the pivot axis of the resilient articulation is such that the base of a perpendicular line from such axis to the belt lies on the approach side of the belt at a slight distance ahead of the point of engagement. A pair of retaining bolts is provided to secure each scraper element, each such pair being disposed on the support tube with their axes symmetrical of a plane extending along the perpendicular line and transverse to the direction of conveyance, with the ends of the bolts projecting toward the conveyer belt, the stationary part of the articulation being adjustably secured to the projecting ends. This form of securing enables individual scraper elements to be adjusted while the conveyer belt is moving, and also obviates shifts in the alignment of the scraping edge relative to scraper elements which have not been adjusted.

5 Claims, 3 Drawing Sheets

SCRAPER DEVICE FOR CONVEYER BELT SYSTEMS

BACKGROUND OF THE INVENTION

The present invention relates to a scraper device for conveyer belt systems, the device having a number of identical scraper elements that extend one beside another substantially over the width of the conveyer belt, with each scraper element basically comprising: a metal scraper or doctor blade that is in resilient engagement with the conveyer belt; an arm that supports the doctor blade; and a resilient articulation that is disposed at the free end of the support arm, the stationary part of the articulation being releasably secured to a common support tube that extends transverse to the direction of conveyance and parallel to the conveyer belt, the scrapersupport arm being deflectable about an axis that extends substantially parallel to the support tube, the scraping edge of the doctor blade being so positioned that the base of a perpendicular line from the axis of the articulation to the conveyer belt lies on the approach side of the belt at a slight distance ahead of the point of engagement of the scraping edge, the support tube being so secured at its ends to retaining means that the distance between such tube and the conveyer belt is adjustable.

Scraper devices of this general kind are known, for example, from DE-OS No. 32 11 626. If scraper devices of this kind are to provide satisfactory cleaning, the individual scraper elements that make up a device must each have their doctor blade in resilient engagement with the belt at substantially the same preloading or biasing for each blade, and they must be able to retain this ability for a very long peiod of operation. Since a conveyer belt is usually stressed more heavily at its center than at its edges, the scraper elements at the center are of course subject to greater wear than are the outer scraper elements. Consequently, the more worn scraper elements require periodic adjustment of their doctor blades to ensure that the blade engages the belt at the required pressure.

As a rule, all the scraper elements of a device can be simultaneously adjusted by way of their end retaining means even when the belt is running; however, the adjustment of individual scraper elements of the known construction, while the belt is running, is possible either only with great difficulty or not at all. The main reason for this is the nature of the adjustable securing of the individual scraper elements to the common transverse cross-member. In the aforementioned known scraper device, such securing comprises a clampable clip or the like that is mounted on a tubular cross-member and can be secured by frictional engagement. When a clip is released for adjustment purposes while the belt is running, the scraper element is entrained by the moving belt simultaneously with its release, and is pivoted outwardly and downwardly.

In the type of adjustable securing of a scraper element to a tubular cross-member just described, the complete element orbits about the axis of the tubular member while the blade is being adjusted. This leads to another serious disadvantage in addition to the drawback already referred to. When a scraper device is installed, its elements are adjusted in such a way that the scraping edges of the individual blades are substantially in alignment with one another. If individual blades wear prematurely and the corresponding elements are adjusted individually, the orbiting movement results in a lateral shifting of the point where the edge engages the belt, i.e., the scraping edges of the adjusted blades cease to be in alignment with the other, i.e. unadjusted, blades. Consequently, the very narrow gap between adjacent blades necessarily increases at the joints, so that there is a risk that the material that is to be scraped-off will pass through the larger gaps.

It is therefore an object of the present invention to design the releasable securing of the individual scraper elements to the common support tube of a scraping device for conveyer belt systems in such a way that the aforementioned drawbacks are obviated, i.e., the securing has as its first requirement that the adjustment of individual doctor blades is simple and safe, even when the belt is moving. Furthermore, there must be no shift in the alignment of the adjusted scraper elements, and the securing arrangement must be compact.

BRIEF DESCRIPTION OF THE DRAWINGS

These and other objects and advantages of the present invention will appear more clearly from the following specification in conjunction with the accompanying schematic drawings, in which:

FIG. 2 is a side view of the device of

FIG. 1 taken in the direction of the arrow II thereof, with some parts shown sectioned.

SUMMARY OF THE INVENTION

Figure 1:
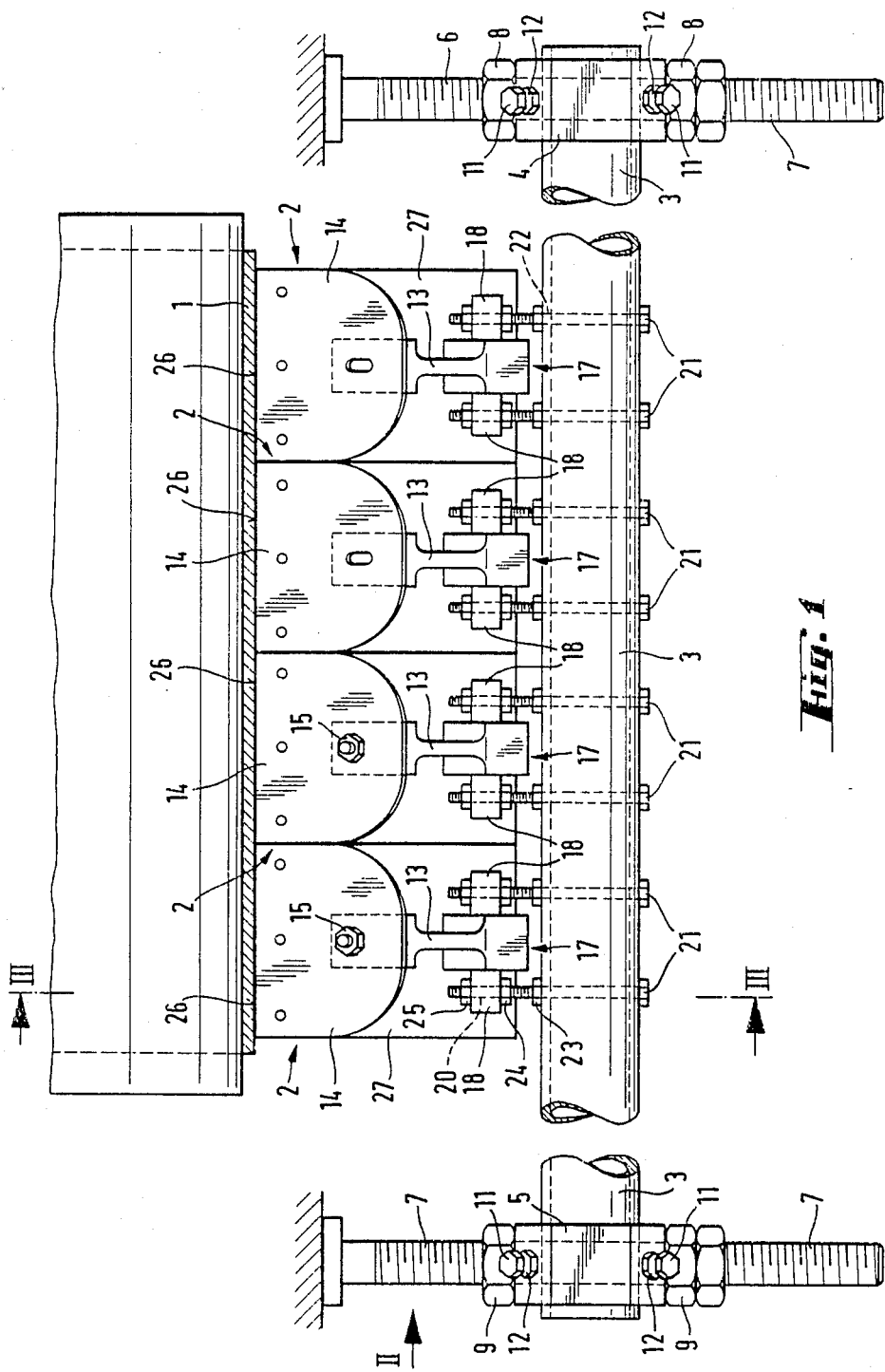
FIG. 1 is an end view of one exemplary embodiment of the inventive scraper device.

The scraper device of the present invention is characterized primarily in that, to secure the stationary part of each resilient articulation, respective pairs of retaining bolts are provided, each such pair including a resilient articulation between them, the bolts being disposed on the support tube with their axes symmetrical of a plane extending aong the perpendicular line and transverse to the direction of conveyance, with the ends of the bolts projecting beyond the support tube and toward the conveyer belt, the stationary part of the articulation being secured to such ends in such a way as to be adjustable in the direction of the bolt axis.

Advantageously, the retaining bolts are threaded bolts, each of which is retained in aligned bores in the support tube, the stationary articulation part being mounted on the projecting threaded ends and being clampable by means of threaded nuts.

Conveniently, if commercially available rubber spring articulations are used, the stationary articulation part has, on opposite sides of the articulation, arms that project parallel to the support tube, each such arm being provided with a continuous bore adapted to receive a retaining bolt or threaded bolt.

The inventive adjustable securing of the individual scraper elements to the common support tube provides substantial advantages. The main advantage is that after the nuts retaining the scraper element have been loosened, such element retains its stable position; consequently, individual scraper elements can readily be adjusted even while the belt is moving.

Also, since, in contrast to the known securing in which the individual scraper elements are pivotably mounted on the common support tube, the scraper elements of the present invention are mounted in each case on a pair of stationary retaining bolts, these element move rectilinearly in the direction of their axes during the adjusting movement, so that the adjusted scraper elements do not go out of alignment.

Further advantages are that the securing elements of the present invention are simple to install and take up little space in the conveying direction.

Conveniently, for ready adjustability of all the scraper elements of a device simultaneously as regards the angle at which they are set to the underside of the conveyer belt, the support tube is mounted at its ends for rotation about its axis. Conveniently in this case, fixation can be achieved by having the mounting members be provided with threaded holes that extend radially of the tube axis and which each receive a fixing or set screw, the inner end of which acts on the support tube.

Further specific features of the invention will be described in detail subsequently.

DESCRIPTION OF PREFERRED EMBODIMENTS

Referring now to the drawings in detail, in the embodiment illustrated, the scraper device for cleaning a conveyer belt 1 has four identical scraper elements 2 that are releasably secured, directly adjacent one another, to a common support tube 3 which extends transverse to the direction of conveyance. The tube 3 is mounted at each end in a bore in a mounting member 4, 5, each of which has a further transverse bore by which they are guided on vertical threaded spindles 6, 7. The spindles 6, 7 are rigidly connected at their top ends to the support structure (not shown) of the conveyer belt system. Threaded nuts 8, 9 disposed on both sides of a member 4, 5 on the spindles 6, 7 are operative for vertical adjustment of the tube 3, and after such adjustment help to secure the members 4, 5 in place on the spindles 6, 7. Conveniently, especially in large systems, two parallel threaded spindles are provided per mounting member at both ends of the tube 3. The member of such a doublespindle arrangement is embodied in such a way that the bore for receiving the tube 3 is disposed between the two parallel spindles.

To locate or fix the tube 3 in a desired angular position on the members 4, 5, the latter are each provided with two radially extending, threaded holes 10, each receiving a set screw 11 which, when tightened, presses by way of its inner end on the generated surface of the tube 3 and thus provides the desired clamping between the tube and the mounting members 4, 5. After the screw 11 has been tightened, a lock nut 12 on the screw 11 is tightened against the member 4, 5 to prevent accidental loosening of the screw 11.

Figure 3:
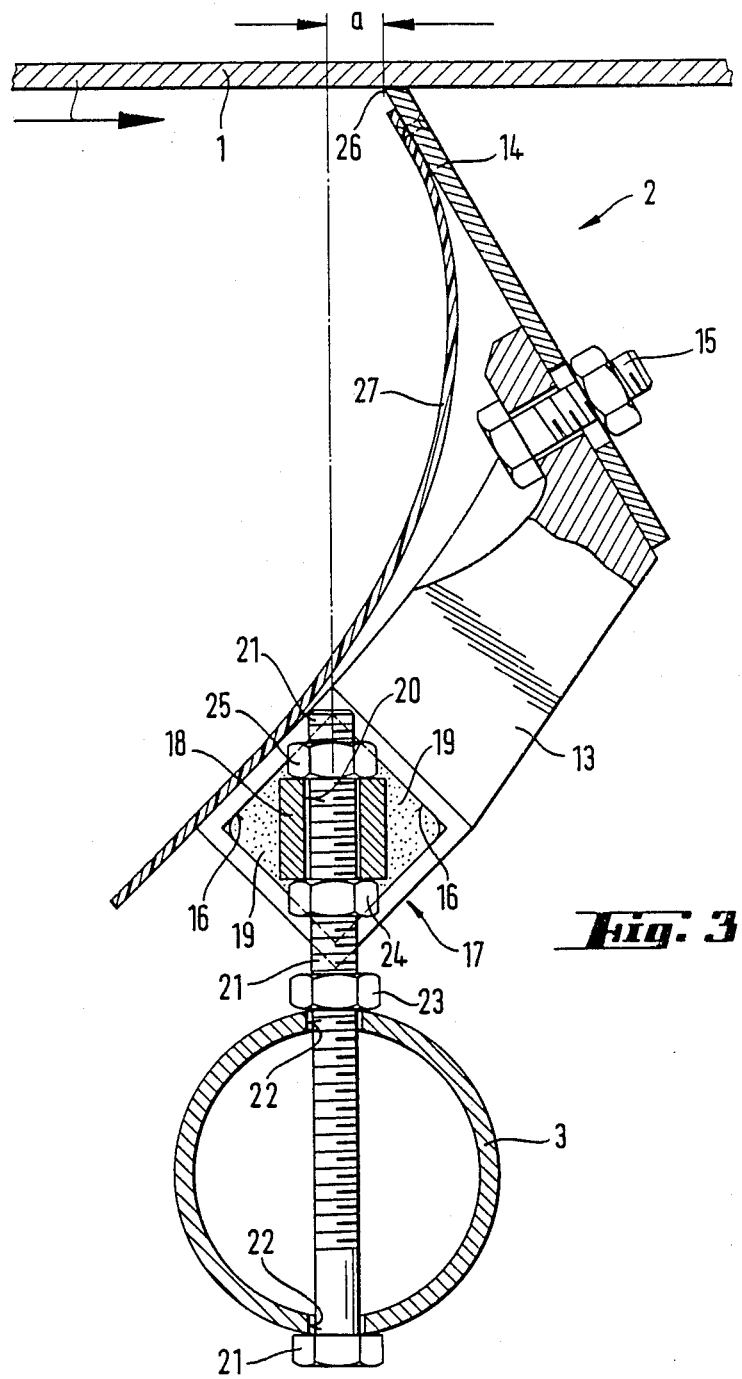
FIG. 3 is an enlarged view of a single scraper element and its securing to the support tube, and is taken along line III—III in FIG. 1.

Each individual scraper element 2 has a carrying or support arm 13 to one end of which is secured a substantially rectangular metal scraper or doctor blade 14 by means of a screw fastening 15, as can be seen in detail in FIG. 3.

At its other end, the arm 13 is provided with a transversely extending, square recess 16 that forms the movable part of a commercially available resilient joint or articulation 17. The second and stationary part thereof is provided in its central part as a square cross-section profile member from which projecting arms 18 extend on both sides. A multipiece intermediate element 19 of rubber or a similar substance is disposed between the two rigid parts of the articulation. The pieces of the intermediate element 19 are clamped by their inherent stress between the inner generated surfaces of the recess 16 and the outer generated surfaces of the profile member that has the outer arms 18. The two rigid parts of the articulation therefore have provision for limited resilient pivoting relative to one another about the axis of the recess 16, such recess being the pivot axis of the resilient articulation.

Each arm 18 is provided with a continuous bore 20 that extends transverse to the articulation axis.

Respective pairs of threaded bolts 21 are disposed on the tube 3 for the adjustable mounting of each scraper element 2. The bolts 21 are introduced from below into aligned bores 22 in the wall of the tube 3, and are of a length such that a threaded portion of sufficient length projects beyond the top of the support tube 3. Each individual bolt 21 is clamped securely to the tube 3 by means of a nut 23. A further nut 24 is disposed above the nut 23. As FIG. 1 shows, each stationary part of an articulation 17 rests by way of its arms 18 on the threaded ends of a pair of bolts 21. A respective further nut 25 is disposed on each projecting free end of the bolts 21 and cooperates with the nut 24 to clamp the arms 18, and hence the element 2, in a desired vertical position.

Figure 2:
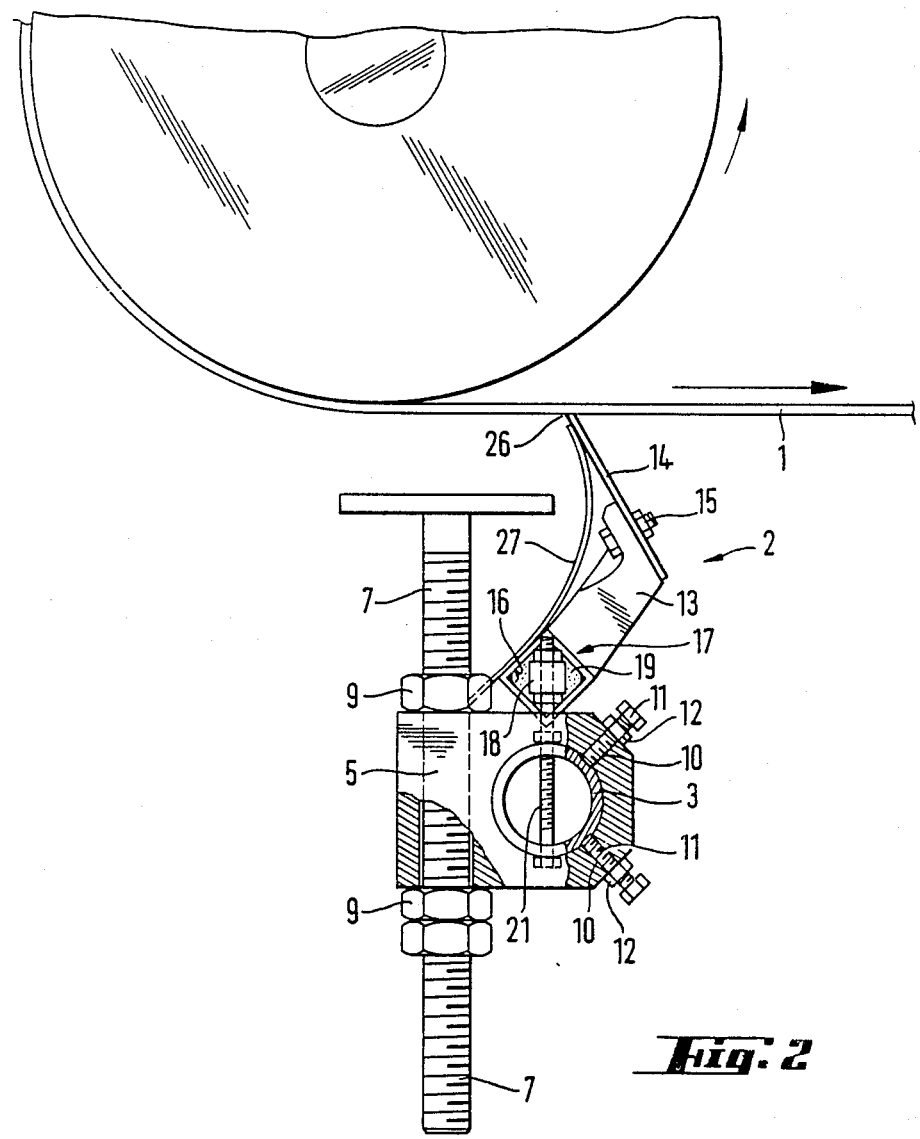

FIGS. 2 and 3 also show the physical position of the scraper element 2 relative to the belt 1. As this illustration also shows, the axes of the bolts 21 intersect the axis of the articulation 17, the latter axis extending substantially parallel to the axis of the tube 3. The base of a perpendicular line from the articulation axis to the underside of the belt 1 is disposed, as considered in the direction of movement thereof, a short distance (a) ahead of the point where the scraping edge 26 of the doctor blade 14 engages the belt 1. This distance (a) does not change when an individual scraper element is readjusted. However, it can be changed in two ways, first by rotation of the tube 3—in which event the resulting change is the same for all of the elements 2 of the deviceand second by shifting the blade 14 relative to the support arm 13 in the blade plane provided that the recess in the blade 14 for the screw fastening 15 is in the form of a slot.

To ensure that material detached from the belt 1 does not reach the elements 2, an apron 27 made of abrasion-resistant hard plastic is secured on the inside of every blade 14 right at the edge 26; the width of the apron 27 corresponds to the width of the blade 14, and the apron extends beyond the articulation 17, so that material sliding down along the aprons 27 is kept away from the elements of the scraper device. The aprons 27 abut one another substantially gaplessly at the joints between two adjacent elements 2, so that shielding is continuous over the scraping width.

To install a new scraper device when the belt is stationary, the various elements 2 are first adjusted in such a way that their blade edges 26 engage lightly and substantially parallel with the underside of the belt 1, whereafter the tube 3 is adjusted vertically towards the belt 1 on the spindles 6, 7 by means of the nuts 8, 9, and is clamped in its vertical position by locking the nuts 8, 9. The various blades 2 are therefore pressed against the belt 1 with substantially the same biasing.

If the belt 1 rises after leaving the reversing or guide roller instead of moving horizontally, the desired distance (a) between the base of the perpendicular and the scraping edge 26 (see FIG. 3) can be provided by an appropriate rotation of the tube 3. In the illustration of FIG. 3, this rotation would have to be counterclockwise.

If after the conveyer belt system has been put into operation it is found that the actual loading of the belt 1, and an associated distortion, results in the belt-engaging pressure of some of the blades 14 being less than that of others, the elements 2 concerned can be readjusted individually if the nuts 25 are first loosened, whereafter the scraper elements 2 are moved toward the belt 1 by means of the nuts 24, and are then clamped in the new position. This redjustment can be carried out easily and safely while the belt 1 moves since the element 2 continues to be retained stably after locking of the nuts 25.

The possibility of being able to adjust individual scraper element 2 while the belt system is moving offers considerable advantages. First, readjustments can be made more frequently than previously because of the simple manipulation, so that scraping efficiency is optimized. Second, since the conveyer belt system does not have to be shut down, there is a substantial cost saving, for in the event of a conveyer system shutdown not only does such a system, by also the feeder systems, commonly found, for example, in mining, have to be shut down. Another point worth considering is that restarting a conveyer belt system calls for special precautions and is time-consuming.

The mounting of a scraper element 2 on two parallel bolts 21 can be regarded as a kind of twopoint mounting. This form of mounting provides the further advantage that, due to the existing clearance of the bolts 21 in the bores 20 in the arms 18, the scraper element can be adjusted with a slight tilt, thus helping to ensure very good parallelism between the scraping edge 26 and the course of the underside of the belt 1 in the transverse direction.

The present invention is, of course, in no way restricted to the specific disclosure of the specification and drawings, but also encompasses any modifications within the scope of the appended claims.

What I claim is:

1. In a scraper device for a conveyer belt system, the device having a number of identical scraper elements that extend, one beside another, over substantially the entire width of the conveyer belt, with each scraper element essentially comprising a metal scraper or doctor blade that is in resilient engagement with said conveyer belt, an arm that supports said doctor blade, and a resilient articulation that is disposed at the free end of said support arm, a stationary part of said articulation being releasably secured to a common support tube that extends transverse to the direction of conveyance and parallel to said conveyer belt, said support arm being adapted to be deflected about an axis that extends substantially parallel to said support tube, the scraping edge of said doctor blade being positioned in such a way that a line extending perpendicular to the axis of said articulation and perpendicular to the conveyor belt lies on the upstream side of the direction of the travel of said belt; at a slight distance ahead of the point of engagement of said scraping edge, said support tube having ends that are secured to retaining means in such a way that the distance between said support tube and said conveyer belt can be adjusted, the improvement wherein:

respective pairs of retaining bolts are provided on said support tube, for each of said scraper elements, to secure said stationary part of each resilient articulation, with the respective articulation being disposed between said bolts of each such pair of bolts; the axes of said bolts are symmetrical to a plane disposed along said perpendicular line and transverse to the direction of conveyance, with each of said bolts having an end that projects beyond said support tube in the direction toward said conveyer belt, with said stationary parts being mounted on said projecting ends in such a way as to be adjustable in the direction of the axes of said bolts.

2. A scraper device according to claim 1, in which said support tube is provided with aligned bores for said bolts, which are threaded bolts having threaded projecting ends, with nuts being provided for clamping said stationary parts of said articulations on said threaded projecting ends.

3. A scraper device according to claim 1, in which said stationary part of each of said articulations includes arms that project laterally beyond opposite sides of said articulation and parallel to said support tube, each of said arms being provided with a continuous bore for receiving one of said retaining bolts of said pair of bolts.

4. A scraper device according to claim 1, in which said ends of said support tube are mounted on said retaining means in such a way as to be rotatable about the axis of said tube.

5. A scraper device according to claim 4, in which said retaining means includes respective mounting members, each having a bore for one of said ends of said support tube; each of said mounting members is furthermore provided with threaded holes that extend radially relative to the axis of said tube and are each adapted to receive a set screw.

* * * * *